US009959607B2

United States Patent
Das et al.

(10) Patent No.: US 9,959,607 B2
(45) Date of Patent: May 1, 2018

(54) AUTOMATIC VERIFICATION OF GRAPHIC RENDITION OF JSON DATA

(71) Applicant: ADP, LLC, Roseland, NJ (US)

(72) Inventors: Tista Das, Somerset, NJ (US); Sachin V. Havaldar, Madison, NJ (US); Laiyuan Liu, Livingston, NJ (US)

(73) Assignee: ADP, LLC, Roseland, NJ (US)

(*) Notice: Subject to any disclaimer, the term of this patent is extended or adjusted under 35 U.S.C. 154(b) by 338 days.

(21) Appl. No.: 14/792,889

(22) Filed: Jul. 7, 2015

(65) Prior Publication Data

US 2017/0011012 A1    Jan. 12, 2017

(51) Int. Cl.
*G06F 17/00* (2006.01)
*G06T 7/00* (2017.01)
*G06F 17/30* (2006.01)

(52) U.S. Cl.
CPC ...... *G06T 7/0002* (2013.01); *G06F 17/30256* (2013.01); *G06F 17/30563* (2013.01); *G06F 17/30592* (2013.01)

(58) Field of Classification Search
CPC .......... G06F 17/2211; G06F 17/30256; G06F 17/30592; G06F 17/30563; G06T 7/0002
USPC .............. 707/737, 755, 756, 758, 761, 805; 345/440, 520; 719/313
See application file for complete search history.

(56) References Cited

U.S. PATENT DOCUMENTS

| | | |
|---|---|---|
| 2012/0306898 A1 | 12/2012 | Scheidhauer et al. |
| 2012/0317236 A1 | 12/2012 | Abdo et al. |
| 2013/0187926 A1 | 7/2013 | Silverstein et al. |
| 2014/0063027 A1 | 3/2014 | Becker |
| 2014/0078144 A1 | 3/2014 | Berriman et al. |
| 2014/0189714 A1* | 7/2014 | Lawbaugh .............. H04L 67/00 719/313 |
| 2014/0344658 A1* | 11/2014 | Srinivasan .......... G06F 17/2235 715/205 |
| 2015/0046389 A1* | 2/2015 | Dhayapule ........ G06F 17/30563 707/602 |

(Continued)

OTHER PUBLICATIONS

Severance, Discovering JavaScript Object Notation, Computer, Year: 2012, vol. 54, Issue: 4, pp. 6-8.*

(Continued)

*Primary Examiner* — Greta L Robinson
(74) *Attorney, Agent, or Firm* — Patrick J. Daugherty; Driggs, Hogg, Daugherty & Del Zoppo Co., LPA (57) ABSTRACT

Aspects provide automatic verification of graphic rendition of JavaScript Object Notation (JSON) data by using a baseline JSON file to render data values of a baseline data set into a baseline graphic presentation that meets a boundary condition requirement for displaying the data values. The baseline data set data values are rendered into a baseline graphic presentation that is stored into a local file system and used to render data values of a second set of data of a back end server data warehouse data into a new graphic presentation, which is compared to the stored baseline graphic presentation on a pixel-by-pixel basis. In response to the pixel-by-pixel comparison indicating a difference in display of boundary condition requirement values, the stored baseline JSON file is revised into a revised baseline JSON file that renders the data values of the second data set into a revised new graphic presentation.

20 Claims, 2 Drawing Sheets

(56) References Cited

U.S. PATENT DOCUMENTS

2016/0292242 A1* 10/2016 Das .................. G06F 11/3668

OTHER PUBLICATIONS

Kousiouris et al., Enabling Proactive Data Management in Virtualized Hadoop Clusters Based on Predicted Data Activity Patterns, 2013 Eighth International Conference on P2P, Parallel, Grid, Cloud and Internet Computing, Year: 2013, pp. 1-8.*

Niu et al., A Design of Cross-Terminal Web Systems based on JSON and REST, 2014 IEEE 5th International Conference on Software Nhginerring and Service Science, Year: 2014, pp. 904-907.*

Zhichun Li et al, WebShield: Enabling Various Web Defense Techniques without Client Side Modifications, NEC Laboratories America, 2013.

Emmanuel Bertin et al, Web-Based Visualization of Very Large Scientific Astronomy Imagery, Computatonal Engineering Finance, and Science, Mar. 25, 2014.

* cited by examiner

AUTOMATIC VERIFICATION OF GRAPHIC RENDITION OF JSON DATA

BACKGROUND

A data warehouse is a relational database that is designed for query and analysis rather than for transaction processing. It usually contains historical data derived from transaction data, but it can include data from other sources. It may separate analysis workload from transaction workload and enable an organization to consolidate data from several sources. In addition to a relational database, a data warehouse environment generally includes back end extraction, transportation, transformation, and loading (ETL) solutions, online analytical processing (OLAP) engines, client analysis tools, and other applications that manage the process of gathering data and delivering it to business users.

Front-end and back-end are terms which refer to the separation of concerns between a presentation layer and a data access layer, respectively, and wherein the data warehouse resides in the back end. The front end is an interface between the user and the back end. The front end is an abstraction layer that simplifies an underlying component by providing a user-friendly interface, including for manipulation and presentation of data retrieved from the back end. Back end code typically resides on a data warehouse server, wherein a back-end application or program serves indirectly in support of the front-end services, to provide access to the data warehouse.

Front end abstraction layers may utilize a variety of different programming language and environment approaches in engaging the back end, and examples include Extensible Markup Language (XML), JavaScript Object Notation (JSON) and Structured Query Language (SQL) environments. XML is a markup language that defines a set of rules for encoding documents presented in the front end in a format which is both human-readable and machine-readable. XML is a textual data format with strong support via Unicode for different human languages. Although the design of XML focuses on documents, it is widely used for the representation of arbitrary data structures such as those used in web services. Several schema systems exist to aid in the definition of XML-based languages, and many application programming interfaces (APIs) have been developed to aid the processing of XML data.

JavaScript Object Notation (JSON) is a language-independent data format that uses human-readable text to transmit data objects consisting of attribute-value pairs. It is often used to transmit data between a server and a web application, including as an alternative to XML.

Structured Query Language (SQL) is a special-purpose programming language generally designed for managing data held in a relational database management system (RDBMS), or for stream processing in a relational data stream management system (RDSMS), and consists of a data definition language and a data manipulation language.

BRIEF SUMMARY

In one aspect of the present invention, a method for automatic verification of graphic rendition of JavaScript Object Notation (JSON) data includes using a baseline JSON file to render data values of a baseline data set into a baseline graphic presentation that meets a boundary condition requirement for displaying the data values. A local reverse proxy server that is disposed in a network communication structure between a front end computer device and a back end server, in response to a request from the front end computer device, retrieves the baseline JSON file from the local file system and the data values of the baseline data set from the back end server. The front end computer device renders the data values of the baseline set of data into the baseline graphic presentation. The baseline graphic presentation is stored in the local file system and used to render in the front end device data values of a second set of data of the back end server data warehouse data into a new graphic presentation, which is compared to the stored baseline graphic presentation on a pixel-by-pixel basis. In response to the pixel-by-pixel comparison indicating a difference in display of values of the boundary condition requirement in the new graphic presentation relative to the baseline graphic presentation, the stored baseline JSON file is revised into a revised baseline JSON file that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

In another aspect, a system has a hardware processor in circuit communication with a computer readable memory and a computer-readable storage medium having program instructions stored thereon. The processor executes the program instructions stored on the computer-readable storage medium via the computer readable memory and thereby uses a baseline JSON file to render data values of a baseline data set into a baseline graphic presentation that meets a boundary condition requirement for displaying the data values. A local reverse proxy server that is disposed in a network communication structure between a front end computer device and a back end server, in response to a request from the front end computer device, retrieves the baseline JSON file from the local file system and the data values of the baseline data set from the back end server. The front end computer device renders the data values of the baseline set of data into the baseline graphic presentation. The baseline graphic presentation is stored in the local file system and used to render in the front end device data values of a second set of data of the back end server data warehouse data into a new graphic presentation, which is compared to the stored baseline graphic presentation on a pixel-by-pixel basis. In response to the pixel-by-pixel comparison indicating a difference in display of values of the boundary condition requirement in the new graphic presentation relative to the baseline graphic presentation, the stored baseline JSON file is revised into a revised baseline JSON file that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

In another aspect, a computer program product for automatic verification of graphic rendition of JSON data has a computer-readable hardware storage device with computer readable program code embodied therewith. The computer readable program code includes instructions for execution which cause the processor to use a baseline JSON file to render data values of a baseline data set into a baseline graphic presentation that meets a boundary condition requirement for displaying the data values. A local reverse proxy server that is disposed in a network communication structure between a front end computer device and a back end server, in response to a request from the front end computer device, retrieves the baseline JSON file from the local file system and the data values of the baseline data set from the back end server. The front end computer device renders the data values of the baseline set of data into the baseline graphic presentation. The baseline graphic presentation is stored in the local file system and used to render in the front end device data values of a second set of data of the back end server data warehouse data into a new graphic presentation, which is compared to the stored baseline graphic presentation on a pixel-by-pixel basis. In response to the pixel-by-pixel comparison indicating a difference in display of values of the boundary condition requirement in the new graphic presentation relative to the baseline graphic presentation, the stored baseline JSON file is revised into a revised baseline JSON file that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Front end processes commonly use JSON to generate meaningful reports and presentations of data retrieved from back end data warehouses. JSON processes interact with back end servers to guide data retrievals and render powerful presentations. However, verifying JSON presentations may present challenges. JSON processes may generate a large variety of charts and graphs. Verifying that any one chart, graph or other visual presentation has rendered correctly or otherwise provides useful information may not be relevant to assessing the value of another.

It is also desirable to separate front end and back end verification processes. For example, it is undesirable to require that revisions and improvements to back end processes be completed prior to improving or correcting JSON code implementations in front end processes, as well as the converse. It is better if these verification processes are independent from each other, while still enabling testing and evaluating them together as needed.

Figure 1:
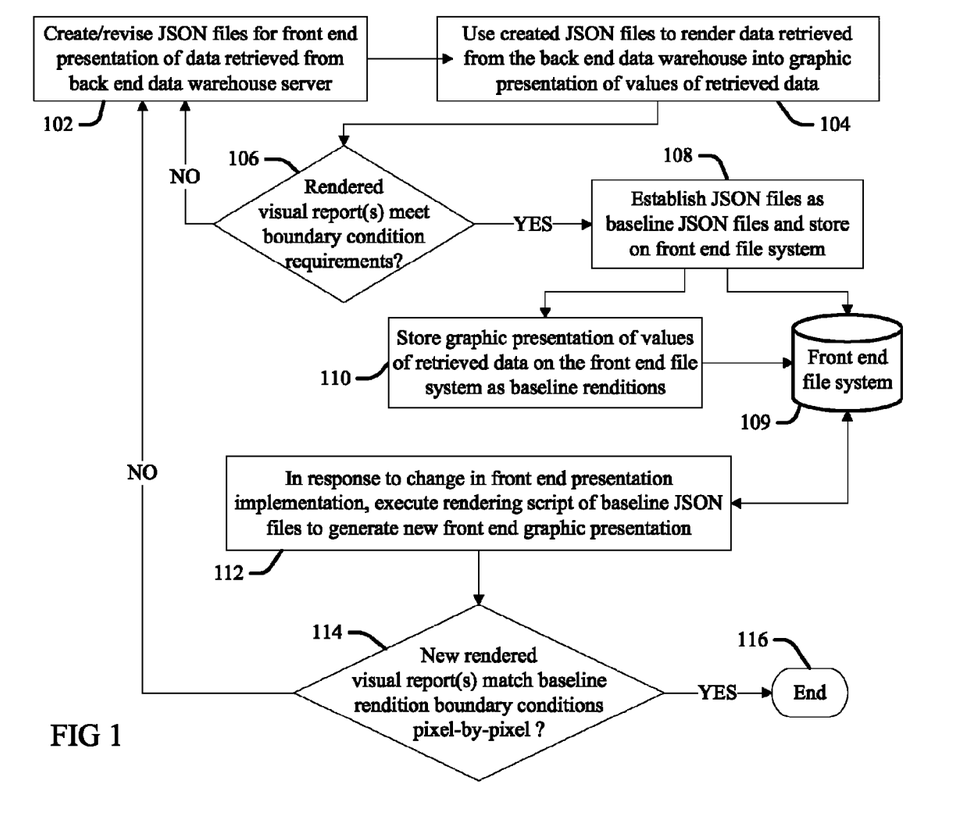
FIG. 1 is a flow chart illustration of a method or process aspect according to the present invention for automatic verification of graphic rendition of JSON data.

FIG. 1 illustrates a method for automatic verification of graphic rendition of JSON data according to the present invention. At 102 JSON files are created for front end graphic presentations for a graphical user interface display of data retrieved from a back end data warehouse server. At 104 the created JSON files are used to render data retrieved from the back end data warehouse into a first graphic presentation that includes one or more visual reports, charts, graphs, reports, etc., of the retrieved data values.

At 106 the rendered visual reports are compared to meet boundary condition requirements for one or more data input scenarios. Boundary conditions include verifying that graph elements plot correctly and represent realistic and possible data value changes over time, and that presented values are within expected ranges and value, without anomalous outliers that are not possible within the boundaries of the possible back end data values. In one example, the boundary condition requirement excludes a display of an outlier data value that does not fit within a permissible range of display of a remaining other of the data values.

If the comparison finds defects in the graphic presentation (the boundary conditions are not met), then the JSON files are revised at 102 in an iterative, feedback loop until the graphic presentation results are successfully verified at 106.

Upon successful verification at 106 (no defects are found), at 108 the JSON files are established as baseline JSON files stored on a local, front end file system 109. At 110 a baseline graphic presentation of data values of the retrieved data first Graphic renditions of the baseline JSON files are also stored on the local file system as baseline renditions.

At 112, in response to a change in a front end presentation implementation (for example via a call for new data from the back end server), rendering script of the baseline JSON files is executed against the new back end data to generate a new front end graphic presentation that comprises one or more charts, graphs, reports, etc. At 114 the new front end graphic presentation is compared via an automated process on a pixel-by-pixel basis to the baseline graphic renditions stored on the local file system at 110 to identify differences that signify errors in display of the boundary conditions or other specified requirements of the JSON graphic display.

If the comparison at 114 does not find differences that signify errors in display of the boundary conditions, etc., then the new rendering is determined to be acceptable (close enough to or the same as the baseline graphic renditions), and the process ends at 116. Otherwise, if the comparison at 114 indicates differences that signify errors in display of the requisite significance, then the process loops back to step 102 wherein the baseline JSON files are revised, or new files created, in an iterative process that repeats the steps of establishing and saving revised JSON files, and optionally revised graphic renditions as needed, until rendering of the new data is found acceptable at 106. Thus, if there is any difference when comparing presentations with the baseline presentations, service providers may investigate to determine the cause of the apparent defects, including via accessing details and data acquired relative to the back end server data warehouse data source when needed.

Figure 2:
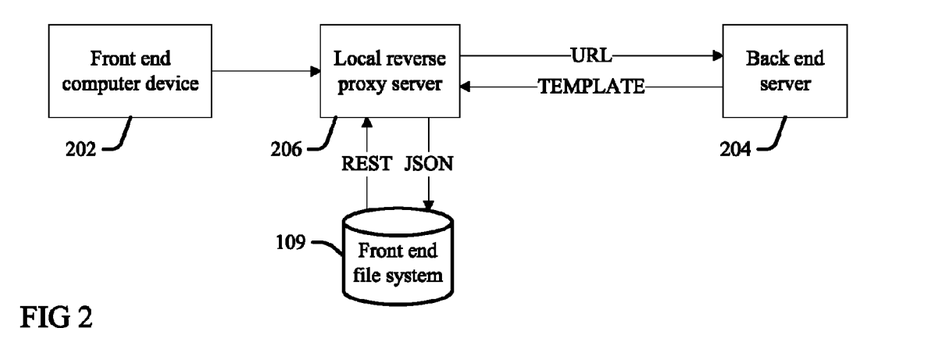
FIG. 2 is a block diagram that illustrates an implementation of the process or system of FIG. 1.

FIG. 2 is a block diagram that illustrates an implementation of the process or system of FIG. 1. A front end device 202 (for example, a lap top computer or other networked computing device) is used to configure and present front end presentations from data stored locally on the front end filing system 109, which is separated from a back end server 204 comprising data warehouse data by a local reverse proxy server 206.

Some aspects of the local reverse proxy 206 use Apache™ or Nginx™, though other software implementations may be practiced. (APACHE, APACHE HADOOP and HADOOP are trademarks of the Apache Software Foundation in the United States or other countries; NGINX is a trademark of Nginx Software Inc. in the United States or other countries.) The local JSON storage device 109 can be local or centralized, and in some aspects JSON files in the storage device 109 are served using NodeJS™. (NODEJS is a trademark of Joyent, Inc. in the United States or other countries.)

The structure of FIG. 2 enables a front end developer to create JSON files and their graphic presentations (at steps 102 through 110 of FIG. 1) via the front end device 202 without having to wait for the backend server 204 data to be ready. Once the front end presentation is done, a service provider team can verify a rendering for storage at 110, without having to wait for the backend to be complete, which may take a significantly longer time.

The local reverse proxy 206 makes Uniform Resource Locator (URL) calls to the back end server 204 against data warehouse data stored therein as needed. In some examples, a URL call is made using Microsoft XML HTTP, which implements an XML HTTP object that has functionality enabling the exchange of Extensible Markup Language (XML) data directly over the Internet using the Hypertext Transfer Protocol (HTTP). The XML HTTP object enables access of the back end 204 data warehouse data from a Web server, parsing the data using an XML Document Object Model (DOM), as well as posting XML data through a typical firewall via a template directly to the local reverse proxy 206 in response.

The front end device 202 creates graphic renditions of data retrieved from the back end server 204 (at 104 and/or 112 of FIG. 1) via application of the JSON files stored on the local JSON storage device 109, retrieving said JSON files via the local reverse proxy 206. The local reverse proxy 206 calls for the stored JSON files, and the local JSON storage device 109 replies with representational state transfer (REST) responses.

Aspects address problems in the prior art by enabling testing in the front end that is independent of back end data. Reviewing back end data generally involves a translation from machine language data. Testing in the front end instead enables the use of repeatable procedures that may be modified on a local machine as needed to verify renditions of different boundary condition scenarios.

Aspects provide for client-facing analytics wherein simple and elegant client metrics are accessible through customizable application dashboards in the front end device 202 that combine data elements across Human Capital Management (HCM) domains in a common location. Open API architecture may enable rendering in the front end device 202 via deeply embedded JSON elements and provide means for clients to import non-HCM data for additional analytics as needed.

Customizable metrics in the front end JSON creation process enable the use of adjustable views, filters, data drill-down with the ability to set thresholds, wherein users can build and share metrics and dashboards independent of back end data demands. Metric requirements may drive data specifications for data integration and extraction, wherein source systems feed data matching target data specs.

Aspects of the present invention may employ new custom reporting frameworks in the front end device 202 and the local reverse proxy 206 that are based on Java Persistence API (JPA™) 2.0 criteria that dynamically assemble queries based on filter, view by, time period, user security and other custom or user specified criteria. (JAVA, JAVA PERSISTENCE API and JPA are trademarks of Oracle Corp. in the United States or other countries.) By splitting effort between back end database and front end applications, aspects decouple presentation from underlying data and enable switching of underlying fact tables within a same metric, enabling in some examples ten-times better performance over prior art approaches.

The front end application server device 202 need only provide data service API REST services to provide JSON or XML data, wherein all presentation layer logic is removed from the back end server 204 to Javascript on the client side. Java developers can focus on business logic in the back end server 204 while User Interface (UI) developers can focus on presentation in the front end device 202. The application in the front end device 202 becomes less complex as the rendering is developed separately, and testing for data and presentation can be separated.

In some aspects, the back end server 204 uses Hadoop Clusters, which are designed to analyze large amounts of semi and non-structured data wherein data objects are pushed to multiple nodes across a cluster for parallel processing, and querying a cluster includes all nodes scanning data elements to which they have access in order to find patterns. Hadoop is advantageous for deep analysis across seemingly disconnected data-points to find relationships, enabling finding writing and sentiment patterns via text analysis, transforming and loading data in original raw form and into structured models, and applying algorithms designed on smaller sets to huge data sets to execute wide explorations that find patterns (outliers, correlations, etc.).

Aspects of the present invention include systems, methods and computer program products that implement the aspects described above. A computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
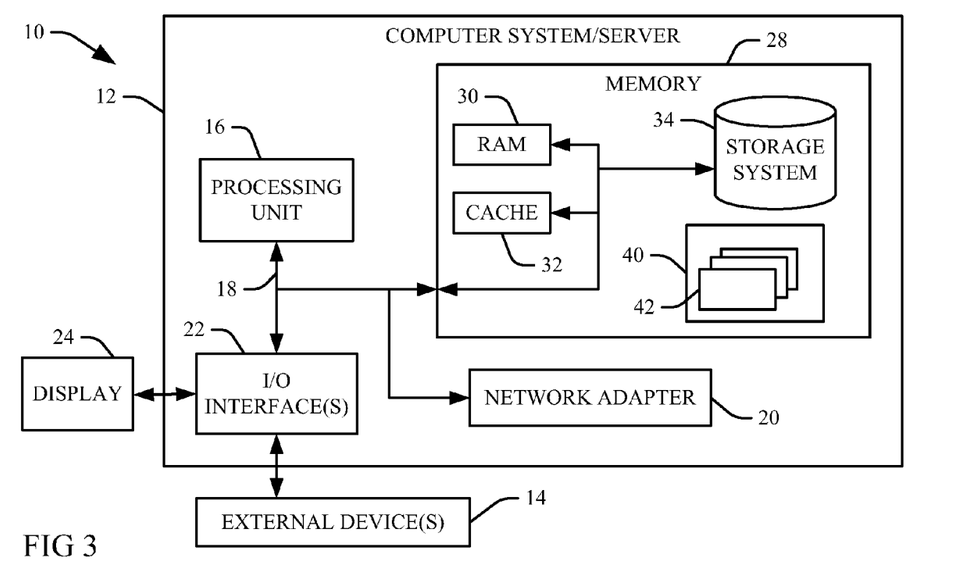
FIG. 3 depicts a computer device according to the present invention.

Referring now to FIG. 3, a programmable device 12 is operational with numerous other computing system environments or configurations for automatic verification of graphic rendition of JSON data according to the present invention. Examples of well-known computing systems, environments, and/or configurations that may be suitable for use with programmable device 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Programmable device 12 may be described in the general context of computer system-executable instructions, such as program modules, being executed by a computer system. Generally, program modules may include routines, programs, objects, components, logic, data structures, and so on that perform particular tasks or implement particular abstract data types. Programmable device 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, a special purpose programmable device 12 according to the present invention is a computer system/server device structure located within a cloud computing node 10. The components of the programmable device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The programmable device 12 typically includes a variety of computer system readable media. Such media may be any available media that is accessible by the programmable device 12, and include both volatile and non-volatile media, removable and non-removable media.

System memory 28 can include computer system readable media in the form of volatile memory, such as random access memory (RAM) 30 and/or cache memory 32. Programmable device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Programmable device 12 may also communicate with one or more external devices 14 such as a keyboard, a pointing device, a display 24, etc.; one or more devices that enable a user to interact with programmable device 12; and/or any devices (e.g., network card, modem, etc.) that enable programmable device 12 to communicate with one or more other computing devices. Such communication can occur via Input/Output (I/O) interfaces 22. Still yet, programmable device 12 can communicate with one or more networks, such as a local area network (LAN), a general wide area network (WAN), and/or a public network (e.g., the Internet) via network adapter 20. As depicted, network adapter 20 communicates with the other components of programmable device 12 via bus 18. It should be understood that although not shown, other hardware and/or software components could be used in conjunction with programmable device 12. Examples include, but are not limited to: microcode, device drivers, redundant processing units, external disk drive arrays, RAID systems, tape drives, and data archival storage systems, etc.

In one aspect, a service provider may perform process steps of the invention on a subscription, advertising, and/or fee basis. That is, a service provider could offer to integrate computer-readable program code into the programmable device 12 to enable the programmable device 12 to perform the methods, systems and processes discussed above with respect to FIGS. 1 through 7. The service provider can create, maintain, and support, etc., a computer infrastructure, such as the programmable device 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the programmable device 12, from a tangible computer-readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic verification of graphic rendition of JavaScript Object Notation (JSON) data, the method comprising executing on a processor the steps of:

using a stored baseline JSON file to render data values of a baseline data set into a baseline graphic presentation that meets a boundary condition requirement for displaying the data values, wherein a local reverse proxy server that is disposed in a network communication structure between a front end computer device and a back end server, in response to a request from the front end computer device, retrieves the stored baseline JSON file from a local file system of the front end computer device, and retrieves the data values of the baseline data set from the back end server, and wherein the front end computer device renders the data values of the baseline set of data into the baseline graphic presentation;

storing the baseline graphic presentation in the local file system;

using the stored baseline JSON file to render in the front end device data values of a second set of data of the back end server data warehouse data into a new graphic presentation;

comparing the stored baseline graphic presentation to the new graphic presentation on a pixel-by-pixel basis; and in response to the pixel-by-pixel comparing indicating a difference in display of values of the boundary condition requirement in the new graphic presentation relative to the baseline graphic presentation, revising the stored baseline JSON file into a revised baseline JSON file that is stored on the local file system of the front end computer device and that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

2. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the steps of using the stored baseline JSON file to render the data values of the baseline data set into the baseline graphic presentation, storing the baseline graphic presentation in the local file system, using the stored baseline JSON file to render in the front end device data values of the second set of data of the back end server data warehouse data into the new graphic presentation, comparing the stored baseline graphic presentation to the new graphic presentation on the pixel-by-pixel basis, and, revising the stored baseline JSON file into the revised baseline JSON file that is stored on the local file system of the front end computer device and that renders the data values of the second set of data into the revised new graphic presentation in response to the pixel-by-pixel comparing indicating the difference in display of values of the boundary condition requirement in the new graphic presentation relative to the baseline graphic presentation, wherein comparing the revised new graphic presentation on the pixel-by-pixel basis to the baseline graphic presentation does not indicate the difference in display of the values of the boundary condition requirement in the revised new graphic presentation relative to the baseline graphic presentation.

3. The method of claim 1, further comprising:

creating an initial JSON file that causes the front end computer device to generate an initial front end graphic presentation of the data values of the baseline set of data of the back end data warehouse server that fails to meet the boundary condition requirement for displaying the data values;

revising the initial JSON file into a revised JSON file in an iterative process in the front end computer device until the revised JSON file is used by the front end computer device to render graphic presentation results that meet the boundary condition requirement; and storing the revised JSON file as the stored baseline JSON file that is stored in the local file system for retrieval to the local reverse proxy server in response to the request from the front end computer device.

4. The method of claim 3, wherein the values of the boundary condition requirement displayed in each of said graphic presentations comprise at least one of a chart element value, a graph element value and a report element value.

5. The method of claim 4, wherein the values of the boundary condition requirement displayed in each of said graphic presentations comprise the graph element value, and wherein the boundary condition requirement requires that graph elements within said graphic presentations plot said graph element value to represent a possible data value change within an expected range of values over time.

6. The method of claim 5, wherein the boundary condition requirement excludes a display of an outlier data value that does not fit within a permissible range of display of a remaining other of the data values.

7. The method of claim 6, wherein the local reverse proxy is implemented in one of Apache and Nginx, and the local file system is a JSON storage device implemented in NodeJS.

8. The method of claim 7, wherein at least one of the front end device and local reverse proxy implement Java Persistence API 2.0 criteria that dynamically assemble queries based on at least one of filter, view by, time period and user security criteria.

9. The method of claim 8, wherein the reverse proxy uses application programming interfaces representational state transfer services to retrieve the stored baseline JSON file from the local file system, and a uniform resource locator call to Hadoop clusters within the back end server for the data values of the baseline set of data.

10. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

uses a stored baseline JavaScript Object Notation (JSON) file to render data values of a baseline data set into a baseline graphic presentation that meets a boundary condition requirement for displaying the data values, wherein a local reverse proxy server that is disposed in a network communication structure between a front end computer device and a back end server, in response to a request from the front end computer device, retrieves the stored baseline JSON file from a local file system of the front end computer device, and retrieves the data values of the baseline data set from the back end server, and wherein the front end computer device renders the data values of the baseline set of data into the baseline graphic presentation;

stores the baseline graphic presentation in the local file system;

uses the stored baseline JSON file to render in the front end device data values of a second set of data of the back end server data warehouse data into a new graphic presentation;

compares the stored baseline graphic presentation to the new graphic presentation on a pixel-by-pixel basis; and in response to the pixel-by-pixel comparing indicating a difference in display of values of the boundary condition requirement in the new graphic presentation relative to the baseline graphic presentation, revises the stored baseline JSON file into a revised baseline JSON file that is stored on the local file system of the front end computer device and that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

11. The system of claim 10, wherein the processor executes the program instructions stored on the computer-readable storage medium via the computer readable memory and thereby further:

creates an initial JSON file that causes the front end computer device to generate an initial front end graphic presentation of the data values of the baseline set of data of the back end data warehouse server that fails to meet the boundary condition requirement for displaying the data values;

revises the initial JSON file into a revised JSON file in an iterative process until the revised JSON file is used by the front end computer device to render graphic presentation results that meet the boundary condition requirement; and stores the revised JSON file as the stored baseline JSON file that is stored in the local file system for retrieval to the local reverse proxy server in response to the request from the front end computer device.

12. The system of claim 11, wherein the values of the boundary condition requirement displayed in each of said graphic presentations comprise at least one of a chart element value, a graph element value and a report element value.

13. The system of claim 12, wherein the values of the boundary condition requirement displayed in each of said graphic presentations comprise the graph element value, and wherein the boundary condition requirement requires that graph elements within said graphic presentations plot said graph element value to represent a possible data value change within an expected range of values over time.

14. The system of claim 13, wherein the boundary condition requirement excludes a display of an outlier data value that does not fit within a permissible range of display of a remaining other of the data values.

15. The system of claim 14, wherein the local reverse proxy is implemented in one of Apache and Nginx, and the local file system is a JSON storage device implemented in NodeJS.

16. A computer program product for automatic verification of graphic rendition of JavaScript Object Notation (JSON) data, the computer program product comprising:

a computer readable hardware storage device having computer readable program code embodied therewith, wherein the computer readable hardware storage device is not a transitory signal per se, the computer readable program code comprising instructions for execution by a processor that cause the processor to:

use a stored baseline JSON file to render data values of a baseline data set into a baseline graphic presentation that meets a boundary condition requirement for displaying the data values, wherein a local reverse proxy server that is disposed in a network communication structure between a front end computer device and a back end server, in response to a request from the front end computer device, retrieves the stored baseline JSON file from a local file system of the front end computer device, and retrieves the data values of the baseline data set from the back end server, and wherein the front end computer device renders the data values of the baseline set of data into the baseline graphic presentation;

store the baseline graphic presentation in the local file system;

use the stored baseline JSON file to render in the front end device data values of a second set of data of the back end server data warehouse data into a new graphic presentation;

compare the stored baseline graphic presentation to the new graphic presentation on a pixel-by-pixel basis; and in response to the pixel-by-pixel comparing indicating a difference in display of values of the boundary condition requirement in the new graphic presentation relative to the baseline graphic presentation, revise the stored baseline JSON file into a revised baseline JSON file that is stored on the local file system of the front end computer device and that renders the data values of the second set of data into a revised new graphic presentation, wherein comparing the revised new graphic presentation on a pixel-by-pixel basis to the baseline graphic presentation does not indicate a difference in display of the values of the boundary condition requirement in the revised new graphic presentation relative to the baseline graphic presentation.

17. The computer program product of claim 16, wherein the computer readable program code instructions for execution by the processor further cause the processor to:

create an initial JSON file that causes the front end computer device to generate an initial front end graphic presentation of the data values of the baseline set of data of the back end data warehouse server that fails to meet the boundary condition requirement for displaying the data values;

revise the initial JSON file into a revised JSON file in an iterative process until the revised JSON file is used by the front end computer device to render graphic presentation results that meet the boundary condition requirement; and store the revised JSON file as the stored baseline JSON file that is stored in the local file system for retrieval to the local reverse proxy server in response to the request from the front end computer device.

18. The computer program product of claim 17, wherein the values of the boundary condition requirement displayed in each of said graphic presentations comprise at least one of a chart element value, a graph element value and a report element value.

19. The computer program product of claim 18, wherein the values of the boundary condition requirement displayed in each of said graphic presentations comprise the graph element value, and wherein the boundary condition requirement requires that graph elements within said graphic presentations plot said graph element value to represent a possible data value change within an expected range of values over time.

20. The computer program product of claim 19, wherein the boundary condition requirement excludes a display of an outlier data value that does not fit within a permissible range of display of a remaining other of the data values.

* * * * *